United States Patent
Xu et al.

(10) Patent No.: US 9,898,008 B2
(45) Date of Patent: Feb. 20, 2018

(54) SCENARIO AWARE PERCEPTION SYSTEM FOR AN AUTOMATED VEHICLE

(71) Applicant: Delphi Technologies, Inc., Troy, MI (US)

(72) Inventors: Wenda Xu, Pittsburgh, PA (US); Jarrod M. Snider, Pittsburgh, PA (US); Junqing Wei, Bridgeville, PA (US)

(73) Assignee: Delphi Technologies, Inc., Troy, MI (US)

( * ) Notice: Subject to any disclaimer, the term of this patent is extended or adjusted under 35 U.S.C. 154(b) by 60 days.

(21) Appl. No.: 15/076,951

(22) Filed: Mar. 22, 2016

(65) Prior Publication Data

US 2017/0277188 A1 Sep. 28, 2017

(51) Int. Cl.
G05D 1/02 (2006.01)

(52) U.S. Cl.
CPC .......... G05D 1/024 (2013.01); G05D 1/0246 (2013.01); G05D 1/0257 (2013.01)

(58) Field of Classification Search
CPC .... G05D 1/024; G05D 1/0257; G05D 1/0246; G05D 1/0248; G05D 2201/0212; G01S 13/87

See application file for complete search history.

(56) References Cited

U.S. PATENT DOCUMENTS

| 8,145,376 | B2* | 3/2012 | Sherony | B60W 30/1882 |
| | | | | 701/23 |
| 9,354,075 | B2 | 5/2016 | Kim | |
| 9,534,910 | B2* | 1/2017 | Okumura | G01C 21/34 |
| 2014/0063232 | A1* | 3/2014 | Fairfield | G06K 9/78 |
| | | | | 348/118 |
| 2015/0081156 | A1 | 3/2015 | Trepagnier et al. | |
| 2015/0166069 | A1 | 6/2015 | Engelman et al. | |
| 2015/0307131 | A1 | 10/2015 | Froeschl | |
| 2015/0332101 | A1* | 11/2015 | Takaki | B60R 1/00 |
| | | | | 382/104 |
| 2015/0353094 | A1 | 12/2015 | Harda et al. | |
| 2016/0280264 | A1* | 9/2016 | Baek | B62D 15/0255 |

* cited by examiner

*Primary Examiner* — Michael J Zanelli
(74) *Attorney, Agent, or Firm* — Lawrence D Hazelton

(57) ABSTRACT

A scenario aware perception system suitable for use on an automated vehicle includes a traffic-scenario detector, an object-detection device, and a controller. The traffic-scenario detector is used to detect a present-scenario experienced by a host-vehicle. The object-detection device is used to detect an object proximate to the host-vehicle. The controller is in communication with the traffic-scenario detector and the object-detection device. The controller configured to determine a preferred-algorithm used to identify the object. The preferred-algorithm is determined based on the present-scenario.

6 Claims, 3 Drawing Sheets

SCENARIO AWARE PERCEPTION SYSTEM FOR AN AUTOMATED VEHICLE

TECHNICAL FIELD OF INVENTION

This disclosure generally relates to a scenario aware perception system, and more particularly relates to a system that determines or selects a preferred-algorithm used to identify the object based on the present-scenario

BACKGROUND OF INVENTION

It is known to equip an automated vehicle with various sensors such as a camera, a radar-unit, and/or a lidar-unit to detect various objects such as other vehicles and roadway features for controlling the steering and braking of the host-vehicle. However, the other-vehicles may present themselves to the sensors with an unknown orientation, which makes signal processing of signal from the sensors more difficult.

SUMMARY OF THE INVENTION

The problems described above may be overcome if the orientation or view (e.g. back-view vs. side-view vs. front-view) of another vehicle was known or expected. If the expected perspective of the other vehicles were known, the processing of signals necessary to reliably identify an object as another-vehicle would be simplified. Described herein is a context or scenario aware perception system for operating an automated vehicle (e.g. a host-vehicle) that uses information from a traffic-scenario detector that may include one or more sensors (e.g. camera, radar, and/or lidar) and/or a digital-map to identify or classify the present traffic-situation or present-scenario of the host-vehicle as one of a variety of previously identified possible-scenarios. For example, the system may classify the present-scenario by selecting from a predetermined list or plurality of possible-scenarios that best matches the present-scenario experienced by the host-vehicle.

Then the system selects a preferred-algorithm for processing the signals from an object-detection device that may use some of the same sensors as the traffic-scenario detector, where the preferred-algorithm selected was previously optimized for the present traffic situation or present-scenario. In other words, the system selects the preferred-algorithm from a list of previously defined optimized-algorithms, and the preferred-algorithm that is selected is an algorithm that was optimized for the present-scenario.

The present-scenario may be determined using one or more sensors and/or map-data. By way of example and not limitation, the present-scenario may be determined based on a first-signal from a first-sensor such as a radar-unit, but the preferred-algorithm is applied to a second-signal from a second-sensor such as a camera. By way of further example the preferred-algorithm that is selected may have been optimized for the expected-motion of a possible-target (e.g. other-vehicle) that might be detected using the sensor, or the expected-motion of a detected-target that has been detected using the sensor or other-sensors, OR is being currently tracked using the sensor.

The expected-motion may be determined based on road-geometry and/or anticipated-motion of the sensor arising from an upcoming vehicle-maneuver. The road-geometry may be determined using the sensor, and/or other-sensors and/or map-data. Examples of an upcoming vehicle-maneuver include: a lane-change, a turn across on-coming traffic, and following an other-vehicle on curved road. If a radar-unit is being used as a sensor, the system may select a mode of radar signal processing that is optimized for features of the roadway system proximate to the host-vehicle based on map-data.

By way of further example, the system may select a signal-processing algorithm to process a signal from an object-detection device, where the algorithm is optimized for an expected direction of travel of an other-vehicle which is determined based on map data from a digital-map at a map-location determined by a location-indicator. The system may select an algorithm for image processing based on the expected perspective (e.g. side-view vs. rear-view of other-vehicle) of the other-vehicle to classify the other-vehicle. a target based on map-data (what direction is the other host-vehicle likely traveling). The system may use Lidar to detect when sides of an object are exposed so the camera image processing can ignore part of the image information and more reliably determine that the object is another host-vehicle. A benefit of selecting an optimized algorithm is that safety is improved because less time spent looking for unlikely image matches.

By way of further example, a first scenario is when an other-vehicle traveling in a lane adjacent to that of the host-vehicle, and the other-vehicle changes lanes and moves to a position in front of the host-vehicle, i.e. the other-vehicle cuts in. Because an optimized algorithm was selected for tracking the other-vehicle, the system is able to identify and track the cutting-in other-vehicle faster and more reliably. The preferred-algorithm is selected by using the map information, so the relative location of neighboring lanes is known. The system then tracks the closest of other-vehicles leading the host-vehicle in the neighboring lanes and computes their lateral velocity. In response to detecting that the other-vehicle is cutting in, the host-vehicle starts to perform distance keeping relative to the cutting-in other-vehicle.

A second scenario is ramp merging when the host-vehicle is driving in a travel-lane of a roadway and other-vehicle is on a ramp merging into the travel-lane. A preferred-algorithm is selected to identify and track the merging other-vehicle. Map-data is used to determine the presence of the ramp. The system then tracks the other-vehicle on the ramp which is the closest one to a merging-point. Based on the velocity and acceleration of that other-vehicle, the system computes the time to arrival of the merging-point for the host-vehicle and the merging other-vehicle. The host-vehicle may elect to slow-down or speed-up depending on the relative location of the merging-point and/or a time to arrival.

In accordance with one embodiment, a scenario aware perception system suitable for use on an automated vehicle is provided. The system includes a traffic-scenario detector, an object-detection device, and a controller. The traffic-scenario detector is used to detect a present-scenario experienced by a host-vehicle. The object-detection device is used to detect an object proximate to the host-vehicle. The controller is in communication with the traffic-scenario detector and the object-detection device. The controller configured to determine a preferred-algorithm used to identify the object. The preferred-algorithm is determined based on the present-scenario.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
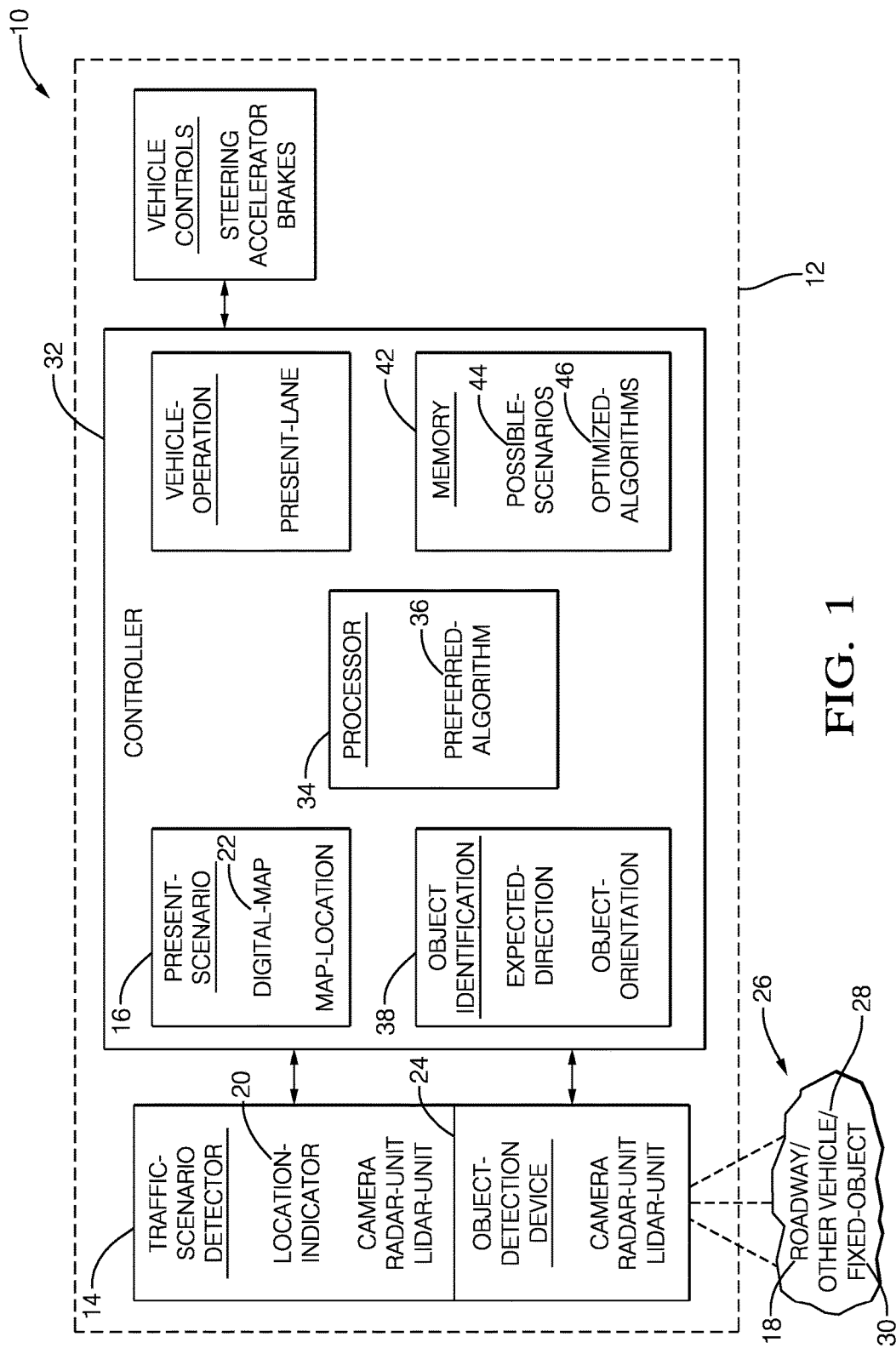
FIG. 1 is a diagram of a scenario aware perception system in accordance with one embodiment.

FIG. 1 illustrates a non-limiting example of a scenario aware perception system 10, hereafter referred to as the system 10, which is generally suitable for use on an automated vehicle, hereafter referred to as the host-vehicle 12. The system 10 includes a traffic-scenario detector 14 used to determine or detect a present-scenario 16, i.e. a traffic-situation, presently being experienced by the host-vehicle 12. As used herein, the present-scenario 16 may be characterized by the configuration of a roadway 18 proximate to the host-vehicle 12. By way of example and not limitation, the present-scenario 16 may be characterized as a multilane expressway (FIG. 2), a two-lane road with an entrance ramp (FIG. 3), a four-way-stop intersection with intersecting two-lane roads oriented at an angle (not limited to a right-angle), a residential roadway lined with driveways to individual residences, and a round-about type intersection with multiple roadways joined to the round-about at a variety of angles.

The traffic-scenario detector 14 may be or may include, but is not limited to, a camera, a radar-unit, a lidar-unit, or any combination thereof that could be useful to characterize or determine the present-scenario 16 of the host-vehicle 12, where the present-scenario 16 is determined based on a signal from the traffic-scenario detector 14. In addition, or as an alternative, the traffic-scenario detector 14 may include a location-indicator 20 that, for example, determines the global-coordinates of the host-vehicle 12 so the system 10 can determine the present-scenario 16 by consulting a digital-map 22 that indicates, for example, the number of lanes of the roadway 18, presence of an entrance or exit ramp, intersection controls (e.g. traffic-signal or stop-sign), and the like. That is, the traffic-scenario detector 14 may include a location-indicator 20, and the present-scenario 16 may be determined based on a map-location 40 of the host-vehicle 12 on the digital-map 22 as indicated by the location-indicator 20.

The system 10 also includes an object-detection device 24 used to detect an object 26 proximate to the host-vehicle 12. The object-detection device 24 may be or may include, but is not limited to, a camera, radar-unit, lidar-unit, or any combination thereof that could be useful to identify or classify the object 26. The object 26 may be, but is not limited to, the roadway 18, features that define boundaries of the roadway 18, an other-vehicle 28, a fixed-object 30 such as a traffic-barrier, building, sign, tree, or any other instance of the object 26 that could be the fixed-object 30.

The system 10 also includes a controller 32 in communication with the traffic-scenario detector 14 and the object-detection device 24. The controller 32 may include a processor 34 such as a microprocessor or other control circuitry such as analog and/or digital control circuitry including an application specific integrated circuit (ASIC) for processing data, as should be evident to those in the art. The controller 32 may include memory 42, including non-volatile memory, such as electrically erasable programmable read-only memory (EEPROM) for storing one or more routines, thresholds, and captured data. The one or more instances of possible-scenarios 44 and/or optimized-algorithms 46 that may be used the processor to perform steps to determine a preferred-algorithm 36 used to identify or determine an object-identification 38 of the object 26, where the preferred-algorithm 36 is determined based on the present-scenario 16, as will be described in more detail below. Accordingly, the controller 32 may be configured to select the present-scenario 16 from a plurality of possible-scenarios 44 stored in the memory 42.

Figure 2:
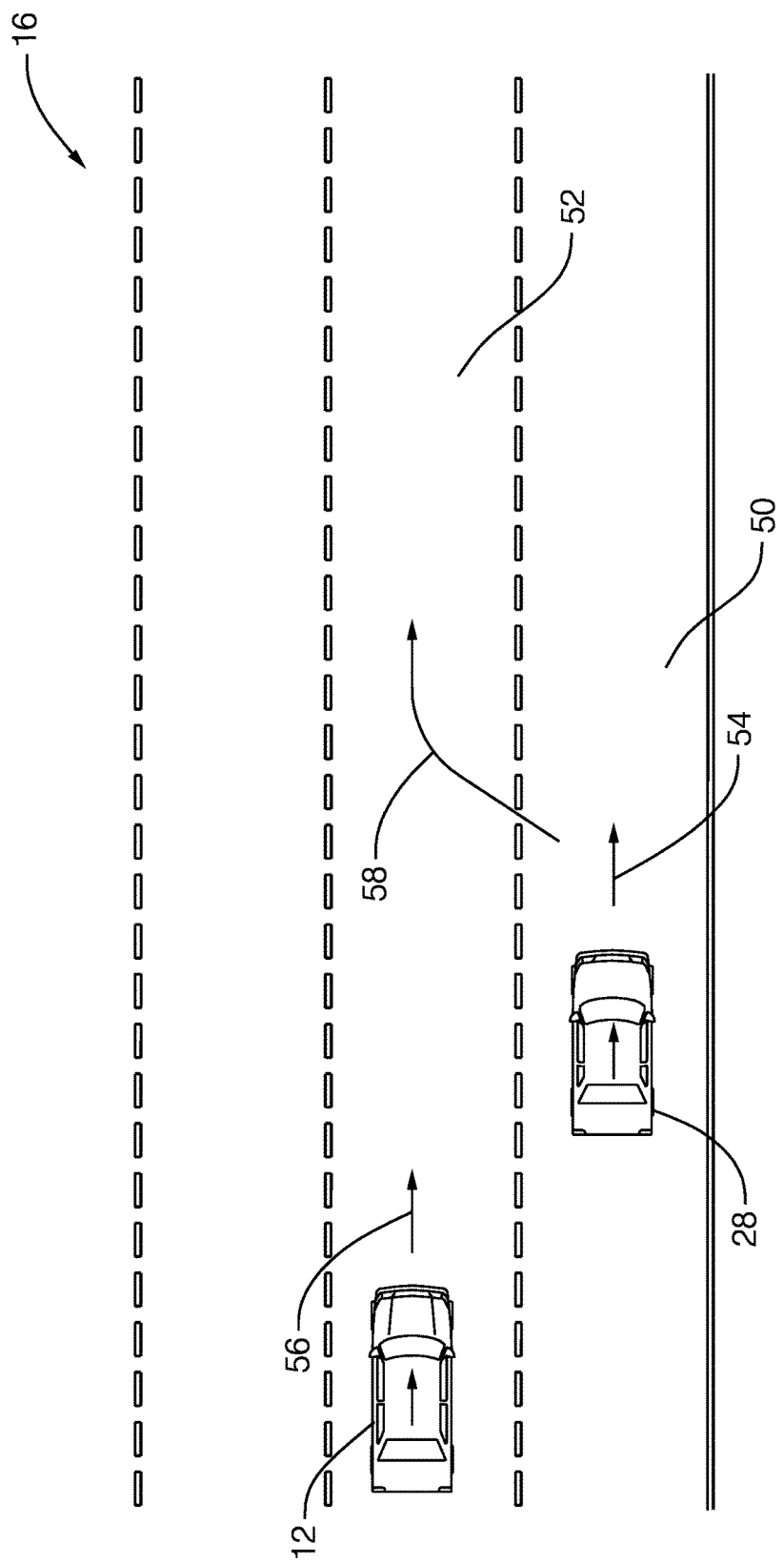
FIG. 2 is traffic scenario encountered by the system of FIG. 1 in accordance with one embodiment.

FIG. 2 illustrates a non-limiting example of the present-scenario 16 that may be characterized as a multilane-expressway where the other-vehicle is traveling in an adjacent-lane 50 that is adjacent to or next to a travel-lane 52 of the host-vehicle 12. The controller 32 may be tracking the other-vehicle 28 using the object-detection device 24. Information from the traffic-scenario detector 14 such as data from the digital-map 22 and/or images from the camera indicate that the present-scenario 16 is a multilane-expressway. The preferred-algorithm 36 selected from the optimized-algorithms 46 is optimized for tracking the other-vehicle 28 along an expected-direction 54 that is parallel to and offset from a travel-direction 56 of the host-vehicle 12. As such, the controller 32 is configured to further determine or select the preferred-algorithm 36 based on the expected-direction 54 of motion of the object 26 relative to the host-vehicle 12 indicated by the present-scenario 16.

The preferred-algorithm 36 may be selected for processing signals from the camera or radar-unit because the perspective the other-vehicle 28 is quartering away from the host-vehicle 12. That is, an image of or radar-reflection from the other-vehicle will likely include data-points that correspond to the tail-end and left-side of the other-vehicle. By way of further example, the processor 34 may attempt to match the present-image from the camera to one of a plurality of previously stored images, or match the radar-reflection to a predetermined reflection-pattern.

The preferred-algorithm 36 may also be selected or optimized to detect lateral motion of the other-vehicle 28 which would occur if the other-vehicle 28 executed a lane-change 58 i.e. moves to a position in front of the host-vehicle 12 or 'cuts-in' to the travel-lane 52. Because an optimized algorithm was selected to monitor for lateral motion, the system is able to identify and track the cutting-in by other-vehicle 28 faster and more reliably. The preferred-algorithm may also selected by using the digital-map 22 since the relative location of the adjacent-lane 50 is known. The system then tracks the closest of other-vehicles leading the host-vehicle 12 in neighboring lanes and computes their lateral velocity. In response to detecting that the other-vehicle 28 is cutting in, the host-vehicle 12 may begin to perform distance keeping relative to the other-vehicle after the cutting-in event.

Figure 3:
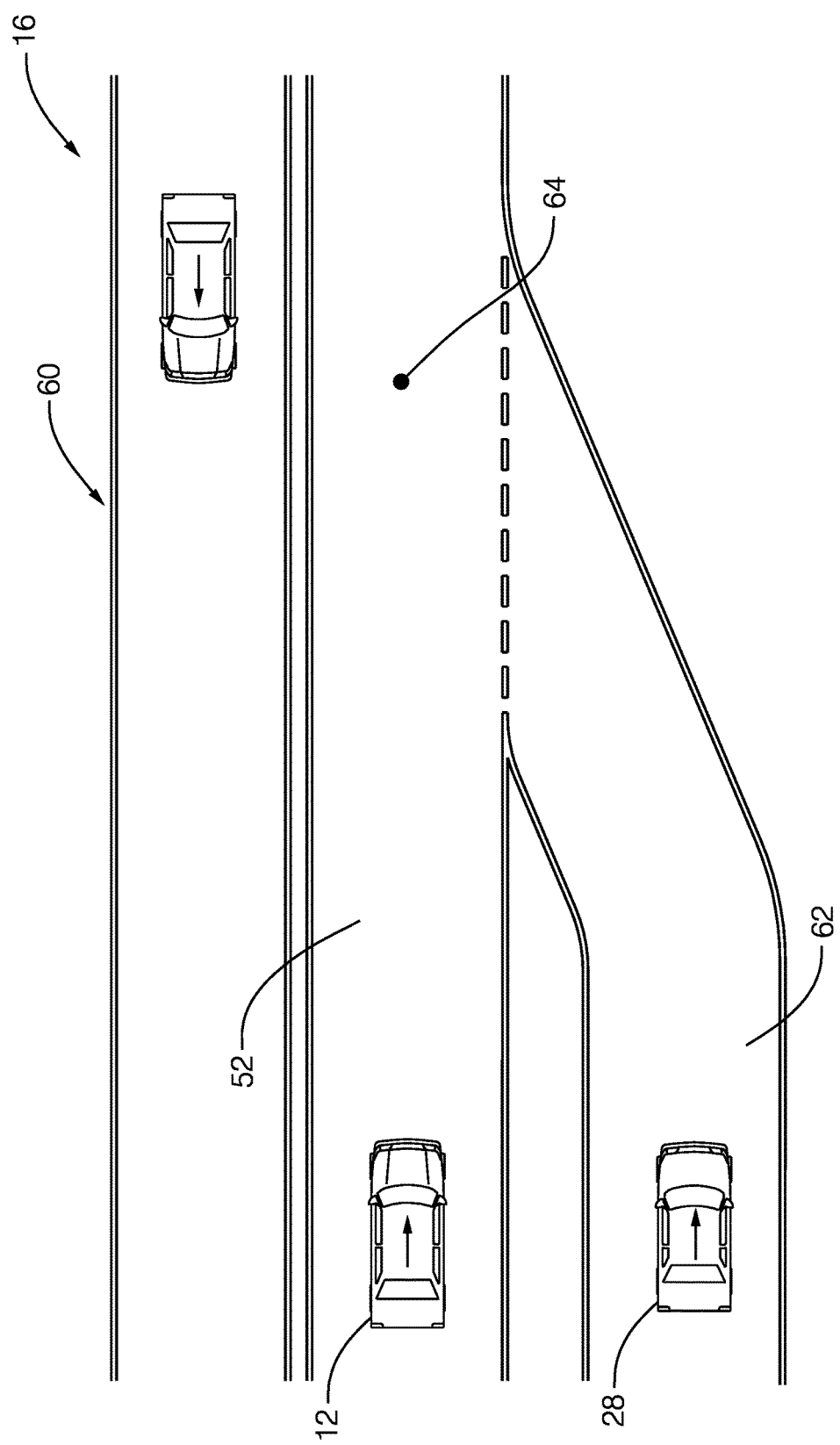
FIG. 3 is traffic scenario encountered by the system of FIG. 1 in accordance with one embodiment.

FIG. 3 illustrates a non-limiting example of the present-scenario 16 that may be characterized as a two-lane road 60 with an entrance-ramp 62 that will merge the other-vehicle into the travel-lane 52. The presence of the entrance-ramp 62 may be determined from the digital-map 22 based on information from the location-indicator 20. The preferred-algorithm 36 may be selected from the optimized-algorithms 46 as one that is optimized to track a vehicle traveling beside but not necessarily parallel to the host-vehicle 12, and one that can readily determine the relative-speed of the other-vehicle 28 with respect to the host-vehicle 12. Based on the relative-speed and acceleration of the other-vehicle 28 with respect to the host-vehicle 12, the system 10 computes a time-to-arrival to a merging-point 64 for the host-vehicle 12 and the other-vehicle 28, and determines if a conflict is likely. The host-vehicle 12 may elect to slow-down or speed-up depending on the location of the merging-point 64 and/or relative times-to-arrival.

Accordingly, a scenario aware perception system (the system 10), a controller 32 for the system 10, and a method of operating the system 10 is provided. The preferred-algorithm used to process signals from the object-detection device 24 is selected based on the present-scenario 16 being experienced by the host-vehicle 12. By selecting an algorithm that has been optimized for the present-scenario, the reliability of tracking the object 26, e.g. the other-vehicle 28, is improved.

While this invention has been described in terms of the preferred embodiments thereof, it is not intended to be so limited, but rather only to the extent set forth in the claims that follow.

We claim:

1. A scenario aware perception system suitable for use on an automated vehicle, said system comprising:
    a traffic-scenario detector used to detect a present-scenario experienced by a host-vehicle;
    an object-detection device that outputs a signal used to detect an object proximate to the host-vehicle; and
    a controller in communication with the traffic-scenario detector and the object-detection device, said controller configured to select a preferred-algorithm from a plurality of optimized-algorithms, said preferred-algorithm used to process the signal from the object-detection device to identify the object, wherein the preferred-algorithm is selected based on the present-scenario.

2. The system in accordance with claim 1, wherein the traffic-scenario detector includes a location-indicator, and the present-scenario is determined based on a map-location of the host-vehicle on a digital-map indicated by the location-indicator.

3. The system in accordance with claim 1, wherein the traffic-scenario detector includes one or more of a camera, a lidar-unit, and a radar-sensor, and the present-scenario is determined based on a signal from the traffic-scenario detector.

4. The system in accordance with claim 1, wherein the system includes a memory, and the controller is configured to select the present-scenario from a plurality of possible-scenarios stored in the memory.

5. The system in accordance with claim 1, wherein the object-detection device includes one or more of a camera, a lidar-unit, and a radar-sensor, and the object is detected based on a signal from the object-detection device.

6. The system in accordance with claim 1, wherein the controller is configured to further determine the preferred-algorithm based on an expected-direction of motion of the object relative to the host-vehicle indicated by the present-scenario.

\* \* \* \* \*